United States Patent [19]

Okamura et al.

[11] Patent Number: 4,916,093

[45] Date of Patent: Apr. 10, 1990

[54] METHOD OF PRODUCING CONTINUOUS INORGANIC FIBER CONSISTING OF SI, N AND O

[75] Inventors: Kiyohito Okamura, Mito; Mitsuhiko Sato; Yoshio Hasegawa, both of Ibaraki, all of Japan

[73] Assignee: Nippon Carbon Co., Ltd., Tokyo, Japan

[21] Appl. No.: 312,392

[22] Filed: Feb. 21, 1989

Related U.S. Application Data

[60] Continuation of Ser. No. 207,934, Jun. 17, 1988, abandoned, which is a continuation of Ser. No. 936,394, Dec. 1, 1986, abandoned, which is a division of Ser. No. 727,816, Apr. 26, 1985, Pat. No. 4,650,733.

[30] Foreign Application Priority Data

Jun. 25, 1984 [JP] Japan .................................. 59-129145

[51] Int. Cl.$^4$ .......................................... C04B 35/80
[52] U.S. Cl. ................................ 501/95; 501/95; 501/96; 501/97; 264/56; 264/65; 264/DIG. 19
[58] Field of Search .................................. 501/95–97; 264/56, 65, DIG. 19

[56] References Cited

U.S. PATENT DOCUMENTS

| | | | |
|---|---|---|---|
| 3,244,480 | 4/1966 | Johnson et al. | 423/344 |
| 3,399,979 | 9/1968 | Hamling | 264/DIG. 19 |
| 3,846,527 | 11/1974 | Winter et al. | 264/DIG. 19 |
| 3,853,567 | 12/1974 | Uerbeck | 106/44 |
| 3,907,954 | 9/1975 | Mansmann et al. | 264/DIG. 19 |
| 3,999,835 | 12/1976 | Newns et al. | 501/37 |
| 4,010,233 | 3/1977 | Winter et al. | 264/63 |
| 4,122,155 | 10/1978 | Prochazka et al. | 423/344 |
| 4,164,528 | 8/1979 | Yajima et al. | 501/92 |
| 4,283,376 | 8/1981 | Yajima et al. | 264/65 |
| 4,476,234 | 10/1984 | Jones et al. | 501/89 |
| 4,483,839 | 11/1984 | Sugiura et al. | 423/344 |
| 4,515,742 | 5/1985 | Yajima et al. | 264/DIG. 19 |
| 4,521,393 | 6/1985 | Saito et al. | 423/344 |
| 4,530,825 | 7/1985 | Johansson | 423/344 |
| 4,534,948 | 8/1985 | Baney | 501/88 |
| 4,543,344 | 9/1985 | Cannady | |
| 4,610,917 | 9/1986 | Yamamura et al. | 428/224 |
| 4,619,905 | 10/1986 | Natansohn et al. | 501/97 |
| 4,650,773 | 3/1987 | Okamura et al. | 501/35 |
| 4,650,837 | 3/1987 | Seyferth et al. | 525/478 |

FOREIGN PATENT DOCUMENTS

| | | | |
|---|---|---|---|
| 1136315 | 7/1961 | Fed. Rep. of Germany | 423/344 |
| 2236078 | 3/1974 | Fed. Rep. of Germany . | |
| 2190764 | 2/1974 | France . | |
| 717555 | 8/1952 | United Kingdom | 423/344 |
| 954285 | 4/1964 | United Kingdom | 423/344 |

OTHER PUBLICATIONS

Suzuki, H. et al., Yogyo Kyokai Shi, vol. 75 (1957), pp. 111–112, "On Nitriding Reactions in the Silicon–Silica System", [English Language Abstract of Reference Cited in IDS Filed Jul. 10, 1987].

Fritz, Von G., Angewandte Chemie, vol. 79 (1967), pp. 657–658 [English Translation: Angew. Chem. Internat. Edit./vol. 6, No. 8, pp. 677–683, "Formation and Properties of Carbosilanes", [Translation of Reference Originally Cited in IDS Filed Jul. 10, 1987].

Zeitschrift fur Anorganische und Allegemeine Chemie, vol. 321 (1963), pp. 10–11 [English Language Abstract Provided=Chemical Abstracts, vol. 59 (1963), col. 5186, [English Language Abstract of Reference Originally Cited in IDS Filed Jul. 10, 1987].

Chemistry Letters, No. 12, Dec. 1984, pp. 2059–2060, Okamura et al., "The Synthesis of Silicon Oxynitride Fibers by Nitridation of Polycarbosilane".

*Primary Examiner*—Brian E. Hearn
*Assistant Examiner*—A. Griffis
*Attorney, Agent, or Firm*—Stevens, Davis, Miller & Mosher

[57] ABSTRACT

A continuous inorganic fiber consisting of Si, N and O has excellent physical, chemical and electrically insulating properties, is superior to carbon fiber in wettability with metal, is low in reactivity with metal, and can be used not only as a reinforcing fiber for fiber-reinforcing type metals and fiber-reinforcing type ceramics, but also in electrical insulating materials and in heat-resistant materials.

8 Claims, 4 Drawing Sheets

FIG_1

FIG_2

FIG_3

FIG_4

FIG. 5

METHOD OF PRODUCING CONTINUOUS INORGANIC FIBER CONSISTING OF SI, N AND O

This application is a continuation of application Ser. No. 207,934, filed June 17, 1988, which is a continuation of Ser. No. 936,394, filed Dec. 1, 1986, now both abandoned, which is a division of Ser. No. 727,816, filed Apr. 26, 1985, now U.S. Pat. No. 4,650,733.

BACKGROUND OF THE INVENTION (1) Field of the Invention:

The present invention relates to a continuous inorganic fiber consisting of Si, N and O and having excellent properties, and a method of producing the same.

(2) Description of the Prior Art:

There can be obtained Si—N—O inorganic compounds by heating and nitriding $SiO_2$ at a high temperature in nitrogen, or by reacting $SiO_2$ with $Si_3N_4$ at a high temperature as disclosed by Brosset et al in Nature, Vol. 201 (1964), page 1211, or by Suzuki et al in Yōgyō-Kyōkai-Shi (Journal of the Ceramic Society of Japan), Vol. 75 (1967), page 111. However, all the resulting Si—N—O inorganic compounds are powders, blocks or wiskers, and an Si—N—O inorganic compound having a continuous fibrous shape has not yet been obtained. A continuous inorganic fiber containing N can be obtained by a method wherein a fiber formed of an organic compound containing N in its molecular structure is fired under an inert gas atmosphere to leave the N contained in the compound in the fired fiber. For example, as disclosed in West German Patent No. 2,218,960, a continuous inorganic fiber containing N can be produced by heating a polycarbosilazane fiber under an inert gas atmosphere. However, in this case, a fiber consisting only of Si, N and O cannot be obtained, but the resulting fiber contains a large amount of C in addition to Si, N and O, and side reactions occur at high temperatures causing deterioration in the properties of the fiber.

SUMMARY OF THE INVENTION

The present invention aims to synthesize a continuous inorganic fiber consisting of Si, N and O, and having excellent properties.

The inventors have found out that, when an organosilicon polymer, such as polycarbosilane, consisting mainly of an Si—C skeleton and not containing N in its molecular structure is used as a precursor and is spun into a fiber, followed by converting the spun fiber into an infusible fiber, and the infusible fiber is heated in an ammonia gas stream, the organosilicon polymer can be completely nitrided without losing its fibrous shape during the thermal decomposition of the above described precursor fiber, and have reached the present invention.

One of the features of the present invention is the provision of a novel continuous inorganic fiber consisting of Si, N and O in a composition ratio wherein the atomic ratio of N/Si is 1.3–0.5 and that of O/Si is 1.0–0.05, said fiber consisting essentially of amorphous fine particles, which consist of Si, N and O, or consisting of a mixture of amorphous fine particles, which consists of Si, N and O, and fine crystal particles of at least one of $Si_2N_2O$ and $\alpha$-$Si_3N_4$ having a crystal particle size not larger than 500 Å.

Another feature of the present invention is the provision of a method of producing a continuous inorganic fiber consisting essentially of Si, N and O, comprising a step for producing an organosilicon polymer of polycarbosilane consisting mainly of an Si—C skeleton and having a molecular weight of 800–50,000; a step for spinning the polycarbosilane; occasionally a step for converting the spun fiber into an infusible fiber under tension or under no tension; a step for heating the infusible fiber at a temperature within the range of 800°–1,650° C. in an ammonia gas stream; and occasionally a step for heating the fiber under an inert gas atmosphere at a temperature being not lower than the above described heating temperature but being not higher than 1,650° C.

DESCRIPTION OF THE PREFERRED EMBODIMENT

The present invention will be explained in more detail hereinafter. First, an explanation will be made with respect to the production method of the fiber of the present invention.

The step for producing polycarbosilane is a step for producing an organosilicon polymer of polycarbosilane consisting mainly of an Si—C skeleton, which is used as a starting material for the synthesis of a continuous inorganic fiber of the present invention. The production of polycarbosilane is disclosed, for example, by G. Fritz et al in Z. Anog. Allg. Chem., Vol. 321 (1963), page 10, Agnew. Chem., Vol. 657 (1967), page 79, and Advan, Inorg. Chem. Radiochem., Vol. 7 (1965), page 349, and further disclosed in detail in U.S. Pat. Nos. 4,052,430 and 4,159,259, and in Japanese Patent Laid-open Specification No. 74,000/77, No. 61,299/79 and No. 16,029/82. In the present invention, the polycarbosilane can be synthesized by any methods disclosed in this prior art. There has hitherto been produced an Si—C inorganic compound from the polycarbosilane. However, the present invention has succeeded in the synthesis of Si—N—O continuous inorganic fiber by using the polycarbosilane as a precursor according to the method described below.

In the spinning step in the production of the fiber, the polycarbosilane obtained as described above is heated and melted, the melted polycarbosilane is filtered to remove harmful substances for spinning, such as microgel, impurities and the like, and then the melted polycarbosilane is spun into a fiber by means of a commonly used spinning apparatus for synthetic fiber. The temperature of the melted polycarbosilane during spining varies depending upon the softening temperature of the starting material polycarbosilane, but is preferably within the range of 50°–400° C. A spinning chimney is occasionally fitted to the spinning apparatus to keep the atmosphere in the spinning chimney to at least one atmosphere selected from the group consisting of air, inert gas, hot air, hot inert gas, steam and ammonia gas, and the extruded fiber is taken up at a high take-up speed, whereby a fiber having a very small diameter can be produced. The spinning speed in the melt spinning varies depending upon the average molecular weight, the molecular weight distribution and the molecular structure of the starting material polycarbosilane, but is preferably within the range of 50–5,000 m/min for obtaining a good result.

In the spinning step in the production of the fiber of the present invention, the following dry spinning method can be carried out instead of the above described melt spinning method. That is, polycarbosilane is dissolved in benzene, xylene, toluene or other solvent capable of dissolving polycarbosilane to prepare a spinning solution, the spinning solution is filtered to remove harmful substances for spinning, such as microgel, impurities and the like, and then the spinning solution is spun into a fiber through a dry spinning method by means of a commonly used spinning apparatus for synthetic fiber, and the extruded fiber is taken up at high take-up speed, whereby the desired fiber having a very small diameter can be obtained. This dry spinning method is particularly preferable iin the spinning of polycarbosilane which does not melt by heating.

In the dry spinning step also, a spinning chimney is occassionally fitted to the spinning apparatus, and the atmosphere in the spinning chimney is a mixed atmosphere consisting of a saturated vapor of at least one of the above described solvents with at least one gas selected from the group consisting of air and inert gas, or to an atmosphere of air, inert gas, hot air, hot inert gas, steam, ammonia gas, hydrocarbon gas or organosilicon compound gas, whereby the solidification of the spun fiber in the spinning chimney can be controlled.

In the present invention, the spun fiber obtained by the above described spinning step is then heated at a low temperature within the range of 50°–400° C. for a period of from several minutes to 30 hours under an oxidizing atmosphere and under tension or under no tension to convert the spun fiber into an infusible fiber. This low temperture heating is carried out in order to oxidize the spun fiber and to prevent the spun fiber from being fused in the subsequent firing step explained later. The oxidized spun fiber does not fuse in the subsequent firing step, and does not adhere to an adjacent fiber even when they are contacted with each other. The low temperature heating is preferably carried out under an oxidizing atmosphere of air, ozone, oxygen or the like. When the low temperature heating under the above described atmosphere is carried out at a temperature lower than 50° C., the spun fiber cannot be converted into an infusible fiber. When the temperature is higher than 400° C., oxidation proceeds excessively. Therefore, a low temperature heating within the temperature range of 50°–400° C. brings about a good result. The low temperature heating time depends upon the above described temperature, and is preferably within the range of from several minutes to 30 hours. As the low temperature heating atmosphere, there can also be used aqueous solutions of $KMnO_4$, $K_2Cr_2O_7$, $H_2O_2$ and other inorganic peroxides in addition to the above described oxidizing gas atmosphere. In this case, the temperature is preferably within the range of from room temperature to 90° C., and the time is preferably within the range of 0.5–5 hours. However, the molecular weight distribution of the polycarbosilane obtained in the above described first step varies depending upon the method utilized to synthesize the polycarbosilane, and the softening temperature of the polycarbosilane is sometimes about 50° C. or lower depending upon the content of low molecular weight compound. When polycarbosilane having a low softening temperature not higher than 50° C. is spun into a fiber, and when the spun fiber is converted into an infusible fiber by subjecting the spun fiber to a low temperature heating at a temperature within the range of 50°–400° C. under an oxidizing atmosphere, it is possible that the fiber will lose its shape. Accordingly, it is preferable to remove the low molecular weight compound, which is contained in the polycarbosilane, through extraction by a solvent, such as alcohol, for example, methyl alcohol, ethyl alcohol or the like, acetone or the like, or through evaporation by heating the polycarbosilane containing the low molecular weight compound at a temperature not higher than 500° C. under reduced pressure or under an inert gas atmosphere, whereby polycarbosilane having a softening temperature not lower than about 50° C. is produced.

In the step for converting the spun fiber into an infusible fiber in the production of the fiber of the present invention, in addition to the above described method for converting the spun fiber into an infusible fiber by low temperature heating under an oxidizing atmosphere, the spun fiber can be converted into an infusible fiber by irradiating with γ-rays or an electron beam under an oxidizing atmosphere of air, oxygen, ozone or the like optionally under tension. Such oxidation also prevents the fibers from melting and fusing with adjacent fibers during firing in the subsequent nitriding step. The γ-ray or electron beam radiation can convert spun fiber into infusible fiber in a short period of time and at room temperature. Therefore, the only one necessary condition in the conversion of spun fiber into infusible fiber by irradiation with γ-rays or an electron beam is that the polycarbosilane obtained in the first step is solid at room temperature. When spun fiber is converted into infusible fiber by the irradiation with γ-ray or electron beam radiation, an appropiate amount of γ-ray radiation is $10^6$–$10^{10}$ R, and that of electron beam radiation is $10^7$–$10^{10}$ Rad.

When the conversion of spun fiber into infusible fiber is carried out under no tension, the spun fiber is shrunk and corrugated. However, this corrugation can be corrected into a proper linear shape in the subsequent firing step. Therefore, tension is not always necessary. However, when it is intended to convert spun fiber into infusible fiber under tension, it is necessary to apply such tension to the spun fiber that is equal to or higher than the tension which can prevent the formation of corrugation due to the shrinkage of the spun fiber. When a tension within the range of 1–500 $g/mm^2$ is applied to spun fiber, a good result can be obtained.

When conversion of spun fiber into infusible fiber is carried out under a tension lower than 1 $g/mm^2$, the spun fiber cannot be kept under a sufficiently high strain to prevent the fiber from becoming slack. On the contrary, a tension higher than 500 $g/mm^2$ is too strong, and spun fiber often breaks. Therefore, conversion of spun fiber into infusible fiber is preferably carried out under a tension within the range of 1–500 $g/mm^2$.

In the present invention, polycarbosilane having a number average molecular weight of 800–50,000, which does not melt on heating, can be obtained depending upon the method used to produce the polycarbosilane. In this case, the polycarbosilane can be spun by a dry spinning method, and the step for converting the spun fiber into infusible fiber can be omitted.

In the present invention, the above obtained infusible fiber is heated at a temperature within the range of 800°–1,650° C. to produce a continuous inorganic fiber consisting of Si, N and O.

The heating is carried out at a temperature within the range of 800°–1,650° C. in an ammonia gas stream under tension or under no tension. During this heating, polycarbosilane constituting the polycarbosilane fiber is subjected to a thermal polycondensation reaction, a thermal decomposition reaction and a nitrogenization reaction to liberate easily volatile matter. A major part of the easily volatile matter is liberated within the temperature range of 400°–600° C., and therefore the polycarbosilane fiber is shrunk and bent. Accordingly, it is particularly advantageous to heat the polycarbosilane fiber under tension in order to prevent this bending. The strength of the tension must be such that, even when the polycarbosilane fiber is shrunk during the heating, the tension can prevent the formation of corrugation of the fiber. In a practical operation, when the polycarbosilane fiber is heated under a tension within the range of 0.001–5 $kg/mm^2$, a good result can be obtained. A tension less than 0.001 $kg/mm^2$ cannot keep a fiber under a stretch sufficient to prevent slack in the fiber. A tension higher than 5 $kg/mm^2$ is too strong, and fiber is often broken. Accordingly, it is preferable to heat the polycarbosilane fiber under a tension within the range of 0.001–5 $kg/mm^2$.

In the heating step, the flow rate of ammonia gas is preferably at least 50 cc/min. When the flow rate of ammonia gas is less than 50 cc/min, carbon remains often in the resulting inorganic fiber, and causes the deterioration of the properties of the fiber at high temperatures. Therefore, the flow rate of ammonia gas is preferably at least 50 cc/min.

By the heating of the polycarbosilane fiber in the ammonia gas stream, the fiber concurrently begins to be converted into an inorganic fiber and to be nitrogenized at 500° C. and these reactions are completed at 800° C. When the heating temperature is lower than 800° C., carbon remains in the fiber and moreover the fiber cannot be completely converted into an inorganic fiber. Accordingly, it is necessary to heat the polycarbosilane fiber up to a temperature of 800° C. in an ammonia gas stream. The polycarbosilane fiber is converted into a continuous inorganic fiber consisting of Si, N and O by the heat treatment up to 800° C.

When the continuous inorganic fiber is further heated at a temperature not lower than 800° C. in an ammonia gas stream, the heat resistance and other properties of the continuous inorganic fiber consisting of Si, N and O are improved.

The further heating of the continuous inorganic fiber at a temperature not lower than 800° C. can be carried out under an inert atmosphere in place of the ammonia gas stream.

The upper limit of the heating temperature is limited to 1,650° C. When the heating temperature is higher than 1,650° C., the strength of the resulting fiber decreases noticeably.

Figure 1:
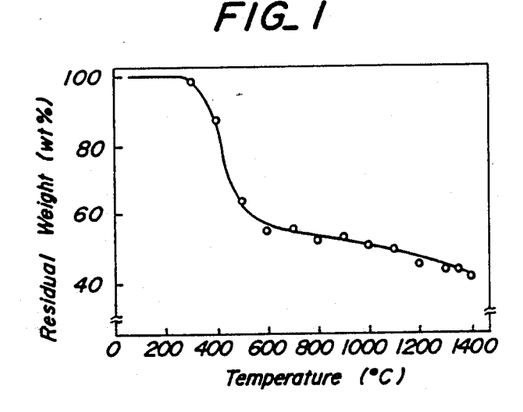
FIG. 1 is a curve illustrating the relation between the heating temperature, at which polycarbosilane used in the spinning in Example 6 is heated in an ammonia gas stream, and the variation of the residual weight of the polycarbosilane due to the thermal decomposition.

FIG. 1 illustrates a relation between the heating temperature, at which polycarbosilane used in Example 6 is heated in an ammonia gas stream, and the change of the weight of the polycarbosilane due to the thermal decomposition. Results of a chemical analysis of the decomposition product in various temperatures are shown in the following Table 1.

TABLE 1

|  | Empirical formula |
|---|---|
| Polycarbosilane | $SiN_{0.00}C_{1.93}H_{4.71}O_{0.02}$ |
| 400° C. | $SiN_{0.02}C_{1.94}H_{4.69}O_{0.03}$ |
| 500° C. | $SiN_{0.14}C_{1.87}H_{4.56}O_{0.04}$ |
| 600° C. | $SiN_{1.31}C_{0.36}H_{1.24}O_{0.06}$ |
| 800° C. | $SiN_{1.26}C_{0.04}H_{0.19}O_{0.05}$ |
| 1,000° C. | $SiN_{1.29}C_{0.03}H_{0.19}O_{0.05}$ |
| 1,200° C. | $SiN_{1.26}C_{0.01}H_{0.15}O_{0.06}$ |
| 1,400° C. | $SiN_{1.24}C_{0.00}H_{0.00}O_{0.05}$ |

In Table 1, the analysis value is shown by the atomic ratio of the elements by assuming that the amount of silicon atom is 1.

The starting material polycarbosilane consists of silicon, carbon and hydrogen, and does not contain nitrogen. When this polycarbosilane is heated in ammonia gas, the polycarbosilane begins to decrease its weight at about 300° C., and then decreases rapidly its weight, and decreases about 45% by weight its original weight until it is heated up to about 600° C. While, the result of the chemical analysis illustrates that the polycarbosilane does not substantially change its composition up to 400° C., the polycarbosilane heated up to 500° C. contains a little amount of nitrogen, the polycarbosilane heated up to 600° C. or higher contains a noticeably increased amount of nitrogen but contains noticeably decreased amounts of carbon and hydrogen, and the polycarbosilane heated up to 800° C. contains substantially no carbon, and nitrogenization of the polycarbosilane is substantially completed at 800° C.

Figure 2:
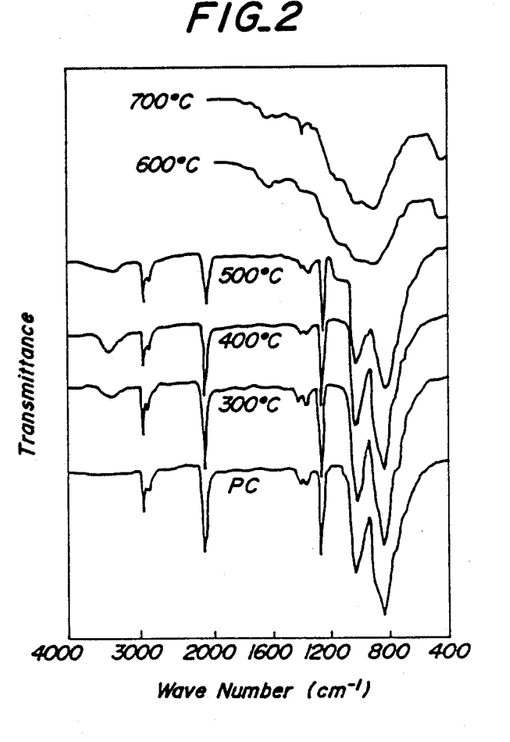
FIG. 2 represents infrared absorption spectra of the products obtained by heating the above described polycarbosilane in an ammonia gas stream at given temperatures.

FIG. 2 shows infrared absorption spectra of the products obtained by heating the polycarbosilane at the above described various temperatures.

It can be seen from FIG. 2 that the infrared absorption spectrum does not substantially change up to 400° C., and an absorption which is probably assigned to Si—N bond appears very slightly in the product at 500° C., and when the treating temperature is raised to 600° C., the spectrum of the product changes noticeably.

It can be understood from the above described results that, when polycarbosilane is heated in an ammonia gas stream, the polycarbosilane is rapidly converted into inorganic compound within the temperature of from 500° C. to 600° C., and at the same time a large amount of nitrogen goes into the product, and a large amounts of carbon and hydrogen are liberated from the product, and the product obtained by heating polycarbosilane at 1,400° C. consists mainly of nitrogen, silicon and oxygen.

During the conversion of polycarbosilane spun fiber into an infusible fiber, oxygen is introduced not only into the surface of the fiber, but also into the interior of the fiber. The X-ray microanalysis of the inorganic fiber obtained through the heating shows that, as the weight increase in the conversion of a spun fiber into an infusible fiber increases, the resulting inorganic fiber has a higher oxygen content. Therefore, it is thought that oxygen, when is one of the elements consisting the inorganic fiber obtained through the heating, has been mainly introduced into the interior of the fiber during the conversion of spun fiber into infusible fiber.

The continuous inorganic fiber obtained by the above described method of the present invention is a novel continuous inorganic fiber consisting essentially of Si, N and O in a composition ratio wherein the atomic ratio of N/Si is 1.3–0.5 and that of O/Si is 1.0–0.05 and containing no C according to chemical analysis. It has been found that the structure of this fiber varies mainly depending upon the amount of oxygen originally contained in the starting material polycarbosilane, the amount of oxygen introduced into spun fiber during its conversion into infusible fiber, and the heating temperature of the infusible fiber; and there are the following three kinds of the structure. (1) When the resulting inorganic fiber has a high oxygen content, for example, as illustrated in Example 1, it has been found from X-ray microanalysis, X-ray diffractometry and the like that a heating of an infusible fiber at 1,000° C. results in an inorganic fiber consisting of amorphous fine particles consisting of Si, N and O, and a heating of an infusible fiber at 1,300° C. results in an inorganic fiber consisting of a mixture of $Si_2N_2O$ fine crystal particles having a particle size not larger than 500 Å and amorphous fine particles consisting of Si, N and O. Further, the higher the heating temperature of an infusible fiber, the larger the amount of fine crystal particles contained in the resulting inorganic fiber is. When the heating temperature of an infusible fiber exceeds 1,450° C., the average crystal particle size in the resulting inorganic fiber becomes considerably large, and when the heating temperature is about 1,650° C., the resulting inorganic fiber contains fine crystal particles having an average particle size larger than 500 Å, and has a low strength. (2) When the resulting inorganic fiber has a middle oxygen content, for example, as illustrated in Examples 2, 3 and 5, it has been found from X-ray microanalysis, X-ray diffractometry and the like that a heating at 1,000° C. results in an inorganic fiber consisting of amorphous fine particles consisting of Si, N and O, and a heating at 1,450° C. also results in an inorganic fiber having substantially an amorphous structure. (3) When the resulting inorganic fiber has an oxygen content lower than that in the fiber of the above described case (2), for example, as illustrated in Examples 4 and 6, it has been found from X-ray micro-analysis, X-ray diffractometry and the like that a heating at 1,000° C. results in an inorganic fiber consisting of amorphous fine particles consisting of Si, N and O similarly to the above described cases (1) and (2), and a heating at 1,300° C. results in an inorganic fiber consisting of a mixture of $\alpha$-$Si_3N_4$ fine crystal particles having a particle size not larger than 500 Å and amorphous fine particles consisting of Si, N and O. Further, the higher the heating temperature of an infusible fiber, the larger the amount of fine crystal particles contained in the resulting inorganic fibers is, similarly to the above described case (1). Moreover, when the heating temperature of infusible fiber exceeds 1,450° C., the average particle size of the fine crystal particles in the resulting inorganic fiber becomes considerably large, and when the heating temperature is about 1,650° C., the resulting inorganic fiber contains fine crystal particles having an average particle size larger than 500 Å, and has a low strength.

The ratio of the amounts of elements constituting the inorganic fiber according to the present invention is varied depending upon the starting material polycarbosilane and the condition for the conversion of spun fiber into infusible fiber, but is such a ratio that the atomic ratio of O/Si is with the range of 1.0–0.05 and that of N/Si is within the range of 1.3–0.5.

Further, it has been found from a chemical analysis that the resulting inorganic fiber sometimes contains remaining H in an atomic ratio of (H/Si)<0.2. The amount of this remaining H can be decreased by carrying out a firing at a higher temperature.

The reason why the continuous inorganic fiber according to the present invention has a high strength is probably that the fiber is formed of amorphous fine particles or a mixture consisting of amorphous fine particles and ultra-fine crystal particles dispersed therein, and therefore the fiber does not contain coarse particles, aggregated particles and large pores, which are sources for the breakage of fiber, and is substantially free from the formation of local stress concentration. Moreover, the continuous inorganic fiber consisting of Si, N and O according to the present invention generally has a tensile strength of 200–400 $kg/mm^2$, a modulus of elasticity of 15–40 $ton/mm^2$ and a specific gravity of 2.1–3.1 and moreover has an excellent electric insulating property of a specific resistance of at least $10^{10}$ $\Omega \cdot cm$. Further, the fiber is excellent in acid resistance, oxidation resistance and heat resistance, is superior to carbon fiber in wettability with metal, is low in the reactivity with metal, and can be not only used as a reinforcing fiber for fiber-reinforcing type metals and fiber-reinforcing type ceramics, but also used in electrical insulating materials and heat-resistant materials by utilizing the above described properties of the fiber.

The invention will be explained in more detail with reference to the following examples, which are merely given to illustrate the invention and never interpreted to limit the scope thereof.

EXAMPLE 1

Into a 5 liter three neck flask were charged 2.5 liters of anhydrous xylene and 400 g of sodium, and heated up to the boiling point of xylene in a nitrogen gas stream, and 1 liter of dimethyldichlorosilane was dropwise added thereto in one hour. After the addition, the reaction mixture was refluxed under heating for 10 hours, thereby obtaining precipitates. The precipitates were filtered out and washed first with methanol and then with water to obtain 420 g of polydimethylsilane white powder. Separately, 3 moles of diphenyldichlorosilane and 1 mole of boric acid were subjected to a dehydrochlorination reaction at 100° C. for 18 hours in a solvent of n-butyl ether, and then 3 moles of water were added to the reaction mixture, and the mixture was heated at 350° C. under a nitrogen atmosphere for 1 hour to obtain a light brown solid borodiphenylsiloxane compound. Then, 8.26 g (3.2 wt%) of this borodiphenylsiloxane was added and mixed into 250 g of the above polydimethylsilane, and the resulting mixture was charged into a 2 liter reaction vessel equipped with a reflux condenser. While stirring the mixture in a nitrogen gas stream, the reaction vessel was heated to raise the temperature of the interior of the vessel up to 350° C., and the reaction was carried out at 350° C. for 6 hours. Then, the reaction mixture was cooled, and the cooled reaction mixture was taken out from the vessel in the form of a benzene solution. After filtration, the benzene solution was heated up to 330° C. in a nitrogen gas stream and kept at this temperature for one hour to remove benzene and a low molecular weight product through distillation, thereby obtaining 125 g of brown solid polycarbosilane with a number average molecular weight of 1,400.

By using a spinning apparatus, the thus obtained polycarbosilane was heated and melted at about 290° C. in a nitrogen gas stream, and spun into air from a spinneret of 300 μm diameter. In this spinning, the spinning speed was 600 m/min, and the diameter of each of the resulting fibers was 12 μm. These fibers were heated in air under no tension at a heating rate of 15° C./hr from room temperature to 110° C., and kept at 110° C. for 0.5 hour to be converted into infusible fibers. In this conversion, the weight increase due to the oxidation in air was about 20 wt%. Then, in an ammonia gas stream (120–150 cc/min) and under no tension, the infusible fibers were heated from room temperature up to 1,300° C. in 13 hours, and kept at 1,300° C. for one hour to obtain colorless transparent fibers. The diameter of each of the resulting fibers was about 8 μm, the tensile strength and the coefficient of elasticity thereof were 290 kg/mm$^2$ and 16 ton/mm$^2$, respectively. The chemical analysis and the X-ray diffraction measurement of the thus obtained fibers, and the X-ray microanalysis of the fiber section showed that the fibers had no carbon and were amorphous inorganic fibers consisting of Si, N and O in a composition ratio such that the atomic ratio of N/Si was about 0.08 and that of O/Si was about 0.08. Further, in the fibers heated at 1,400° C., there appeared broad peaks in the vicinities of 19°, 20°, 26.5°, 37°, 38°, 67.5° and 68.5° at 2θ in the X-ray diffraction pattern. These peaks were considered to be correlated with Si$_2$N$_2$O, and it was presumed that fine crystals of Si$_2$ON$_2$O were produced.

EXAMPLE 2

Into a 1 liter induction rotary type autoclave was charged 250 g of the polydimethylsilane obtained in Example 1, and after the autoclave was deaerated by a vacuum pump, argon gas kept at one atmospheric pressure was sealingly charged into the autoclave. While stirring the polydimethylsilane, the autoclave was heated to raise the temperature of the interior of the vessel up to 470° C., and the temperature of the interior of the vessel was kept at 470° C. for 14 hours. When the reaction was terminated, the pressure of the interior of the vessel was about 105 kg/cm$^2$. Then, after the reaction mixture was cooled to room temperature, the reaction product was taken out in the form of a n-hexane solution. After filtration, the n-hexane solution was subjected to a vacuum distillation to remove a low molecular weight product having a boiling point of up to 280° C./1 mmHg and to obtain 147 g of light brown solid polycarbosilane with a number average molecular weight of 1,800.

Figure 3:
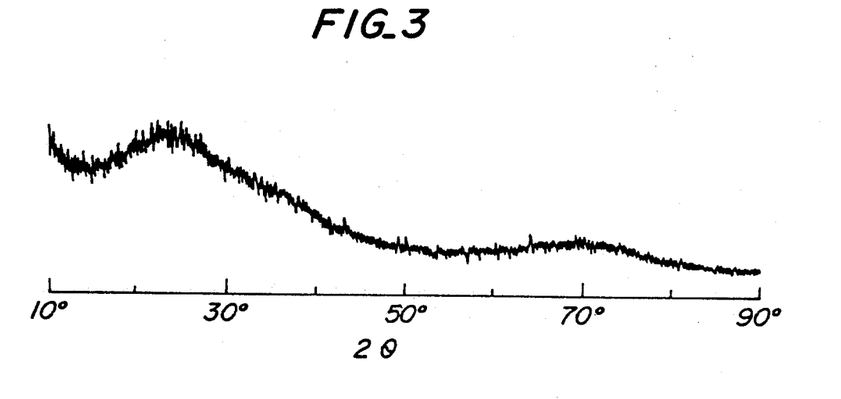
FIG. 3 is an X-ray diffraction pattern of the continuous inorganic fiber obtained in Example 2.
Figure 4:
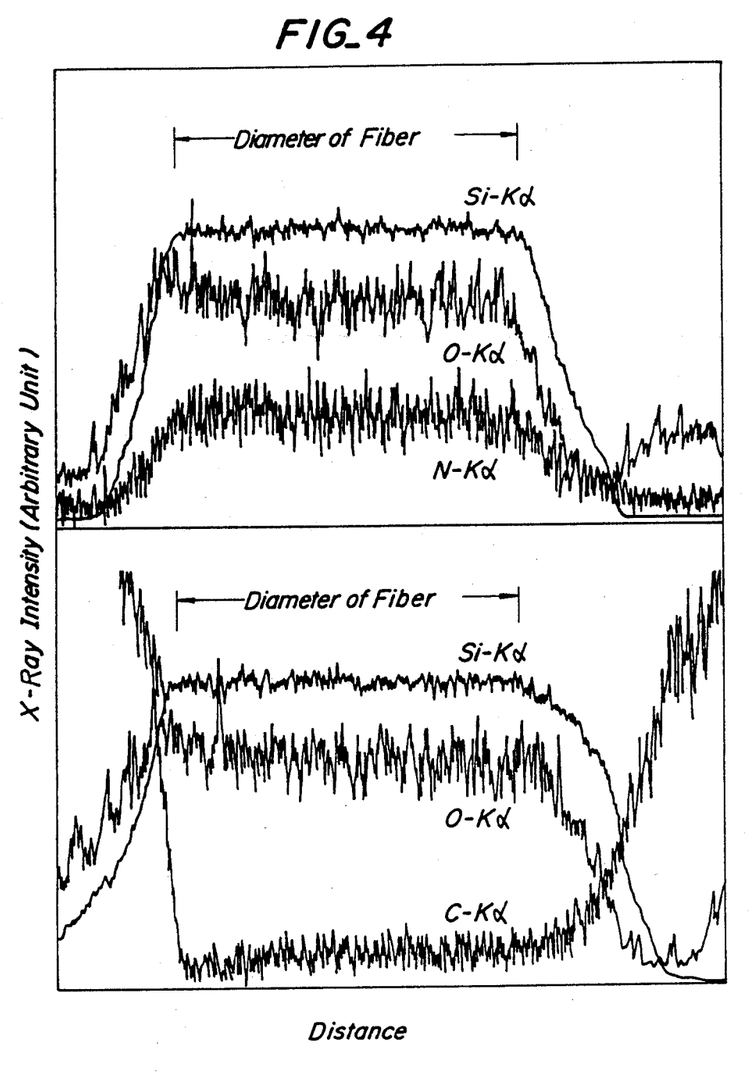
FIG. 4 represents X-ray microprobe analysis of the cross-section of the continuous inorganic fiber obtained in Example 2.

By using a spinning apparatus, the thus obtained polycarbosilane was heated and melted at about 335° C. in a nitrogen gas stream, and spun into air from a spinneret of 300 μm diameter. In this spinning, the spinning speed was 500 m/min, and the diameter of each of the resultant fibers was 18 μm. The fibers were heated at a heating rate of 33° C./hr from room temperature to 190° C. and kept at 190° C. for 0.5 hour in air under no tension to be converted into infusible fibers. In this conversion, the weight increase due to the oxidation in air was about 7.5 wt%. The infusible fibers were further heated up to 1,300° C. in 13 hours and kept at 1,300° C. for one hour in an ammonia gas stream (120–150 cc/min) to obtain colorless transparent fibers. The diameter of each of the fibers thus obtained was about 14.7 μm, the tensile strength thereof was 280 kg/mm$^2$ and the coefficient of elasticity thereof was 19 ton/mm$^2$. The results in the X-ray diffraction measurement and the X-ray microanalysis conducted in the same manner as described in Example 1 are shown in FIG. 3 and in the upper part of FIG. 4, respectively. The resulting fibers were amorphous inorganic fibers consisting of Si, N and O in a composition ratio such that the atomic ratio of N/Si was about 1.0 and that of O/Si was about 0.2. The resulting fibers had an oxygen content smaller than that of the fibers obtained in Example 1. Further, even when the heating temperature was raised up to 1,400° C., no great change appeared in the X-ray diffraction pattern of the fibers, and the fibers were amorphous inorganic fibers consisting of Si, N and O similarly to the case of firing at 1,300° C. The lower part of FIG. 4 shows the X-ray intensity, measured in the same manner as described in Example 1, of a fiber obtained by heating the above described infusible fiber in an inert gas stream, such as N$_2$ stream, Air stream or the like, at the above described heating temperature. It can be seen from the lower part of FIG. 4 that, when the same polycarbosilane fiber as that used in the heating in an ammonia gas stream is heated in an inert gas stream, the resulting fiber consists of Si, C and O.

EXAMPLE 3

Into a three liter reaction vessel equipped with a reflux cooler was charged 300 g of polydimethylsilane obtained in the same manner as described in Example 1. While stirring the polydimethylsilane in a nitrogen gas stream, the reaction vessel was gradually heated to raise the temperature of the interior of the reaction vessel up to 450° C., and the temperature of the interior of the reaction vessel was kept at 450° C. for 15 hours to carry out the reaction. After cooling the reaction product was taken out from the vessel in the form of a xylene solution, and the xylene solution was filtered and then heated at 140° C. to evaporate xylene and to obtain 162 g of solid polycarbosilane with a number average molecular weight of 1,300. The thus obtained polycarbosilane was dissolved in benzene to produce a 50% benzene solution, which was spun into fibers having a diameter of 20 μm at a spinning speed of 200 m/min and at a spinning temperature of 50° C. by using a spinneret having a diameter of 250 μm in the dry spinning method. γ-Rays (1.34×10$^6$ R) were irradiated to the thus obtained fibers under no tension in air to be converted into infusible fibers. The weight increase of the fibers due to the oxidation by this conversion of the fibers into infusible fibers was 6 wt%. The infusible fibers were heated up to 1,300° C. in 13 hours and kept at 1,300° C. for 5 hours under no tension in an ammonia gas stream (120–150 cc/min) to obtain colorless transparent fibers. The diameter of each of the resulting fibers was 18 μm, the tensile strength thereof was 270 kg/mm$^2$, and the coefficient of elasticity thereof was 22 ton/mm$^2$. The chemical analysis and the X-ray diffraction measurement of the obtained fibers and the X-ray microanalysis of the fiber section thereof showed that the fibers obtained by heating both at 1,300° C. and 1,400° C. were substantially amorphous inorganic fibers consisting of Si, N and O similarly to the case of the above-mentioned Example 2, and has an atomic ratio of N/Si of about 1.0 and an atomic ratio of O/Si of about 0.18.

EXAMPLE 4

Into a circulation type reactor equipped with an electric furnace, a condenser, a circulation pump and a trap flask after the interior of the reactor had been replaced with nitrogen gas, was charged 100 g of tetramethylsilane, and the electric furnace was heated to raise the temperature of a reaction tube up to 770° C. Thereafter, tetramethylsilane vapor (the boiling point of tetramethylsilane is 27° C., and the vapor pressure thereof is sufficiently high at room temperature) was repeatedly passed through the reaction tube by a circulation pump, and a reaction was carried out for 24 hours. After completion of the reaction, the reactor was cooled down to room temperature, and the liquid product in the trap flask was taken out therefrom in the form of an n-hexane solution. After filtration, a low molecular weight component having a boiling point not higher than 200° C./1 mmHg was removed through distillation under reduced pressure, to obtain 6.8 g of reddish brown solid polycarbosilane having a number average molecular weight of 870.

By using a spinning apparatus, the thus obtained polycarbosilane was heated and melted at 260° C. in a nitrogen gas stream, and spun into air from a spinneret of 300 μm diameter. In this spinning, the spinning speed was 150 m/min, and the diameter of each of the resulting fibers was 22 μm. These fibers were then heated in air from room temperature to 200° C. at a heating rate of 10° C./hr under no tension, and kept at 200° C. for one hour to be converted into infusible fibers. In this conversion, the weight increase of the fibers due to the oxidation in air was about 2 wt%. Further, the infusible fibers was heated up to 1,300° C. in 13 hours and kept at 1,300° C. for one hour under no tension in an ammonia gas stream (120–150 cc/min) to obtain colorless transparent fibers. The diameter of each of the fibers thus obtained was about 18 μm, the tensile strength thereof was 220 kg/mm$^2$ and the coefficient of elasticity thereof was 25 ton/mm$^2$. The chemical analysis, the X-ray diffraction measurement and the X-ray microanalysis conducted in the same manner as described in Example 1 showed that the fibers thus obtained were amorphous inorganic fibers consisting of Si, N and O in a composition ratio such that the atomic ratio of N/Si was about 1.2 and that of O/Si was about 0.1 The resulting fibers had an oxygen content smaller than the fibers obtained in the above-mentioned Examples 1, 2 and 3. In the X-ray diffraction pattern of the fibers obtained by a heating at 1,400° C., there appeared broad peaks in the vicinities of 20.5°, 23°, 26.5°, 31°, 35°, 62.5° and 65° at 2θ which were considered to be correlated with α-Si$_3$N$_4$, and it was presumed that fine crystals of silicon nitride were produced.

EXAMPLE 5

A reaction product synthesized in the same manner as described in Example 3 was taken out from a reaction vessel in the form of an n-hexane solution. After filtration, the n-hexane was removed, and further a low molecular weight reaction product having a boiling point not higher than 280° C./1 mmHg was removed through distillation under reduced pressure, to obtain 142 g of brown solid polycarbosilane with a number average molecular weight of 2,100.

By using a spinning apparatus, the resulting polycarbosilane was heated and melted at about 310° C. in a nitrogen gas stream, and spun into air from a spinneret of 290 μm diameter. In this spinning, the spinning speed was 220 m/min, and the diameter of each of the obtained fibers was 19 μm. The resulting fibers were heated in air under tension of 50 g/mm$^2$ from room temperature at 170° C. at a heating ratio of 10° C./hr and kept at 170° C. for one hour to be converted into infusible fibers. In this conversion, the weight increase of the fibers due to the oxidation in air was about 6.5 wt%. Further, the thus obtained infusible fibers were heated from room temperature up to 900° C. in 9 hours in an ammonia gas stream (120–150 cc/min) under a tension of 100 g/mm$^2$. Then, the atmosphere was replaced with argon gas, and the temperature was raised from 900° C. to 1,300° C. in four hours, and kept at 1,300° C. for one hour to obtain colorless transparent fibers. The diameter of each of the thus obtained fibers was 15 μm, the tensile strength thereof 310 kg/mm$^2$ and the coefficient of elasticity thereof was 20 ton/mm$^2$. With respect to the fibers obtained by the heating at 1,300° C. and those obtained by the heating at a raised temperature of 1,400° C., the chemical analysis and the X-ray diffraction measurement of the fibers and the X-ray microanalysis of the fiber sections were carried out. It was found that both the fibers obtained by heating at 1,300° C. and 1,400° C. were substantially amorphous inorganic fibers similarly to the fibers obtained in the above-mentioned Examples 2 and 3, and consisted of Si, N and O in a composition ratio such that atomic ratio of N/Si was about 1.0 and that of O/Si was about 0.16.

EXAMPLE 6

Figure 5:
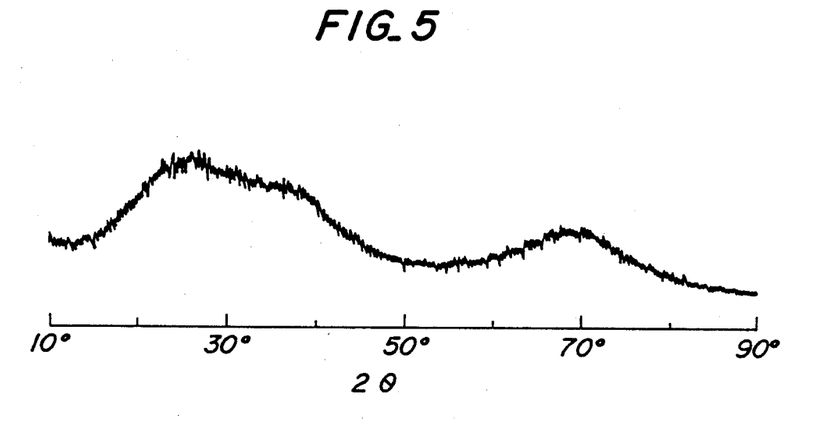
FIG. 5 is an X-ray diffraction pattern of the continuous inorganic fiber obtained in Example 6.

In 50 g of benzene was dissolved 50 g of the polycarbosilane obtained in Example 2, and the resulting solution was poured into a mixed solvent of 150 g of benzene and 50 g of methyl alcohol to obtain 10.5 g of a precipitate. The precipitate was polycarbosilane having a number average molecular weight of 15,000. The polycarbosilane was spun in the same manner as described in Example 3 to obtain fibers, each having a diameter of 20 μm. The spun fibers were converted into infusible fibers by irradiating γ-rays, and then the infusible fibers were heated in an ammonia gas stream (120–150 cc/min) under no tension up to 1,300° C. in 13 hours, and kept at 1,300° C. for one hour to obtain colorless transparent fibers. The diameter of each of the fibers was about 16 μm, the tensile strength thereof was 300 kg/mm$^2$ and the coefficient of elasticity thereof was 27 ton/mm$^2$. In this same manner as described in Example 1, the chemical analysis, the X-ray diffraction measurement (FIG. 5) and the X-ray microanalysis were carried out. It was found that the obtained fibers were amorphous inorganic fibers consisting of Si, N and O in a composition ratio such that the atomic ratio of N/Si was about 1.3 and that of O/Si was about 0.06. The resulting fibers had an oxygen content smaller than that of the fibers obtained in Example 4. The fibers obtained by heating at 1,400° C. had broad peaks in the vicinities of 20.5°, 23°, 26.5°, 31°, 35°, 62.5° and 65° at 2θ in the X-ray diffraction pattern, which were considered to be correlated with α-Si$_3$N$_4$, and it was presumed that fine crystals of silicon nitride were produced.

What is claimed is:
1. A method for producing a continuous inorganic fiber consisting essentially of Si, N and O in a composition ratio wherein the atomic ratio of N/Si is 1.3/0.5 and that of O/Si is 1.0/0.05; which comprises:
(a) spinning a fiber from a polycarbosilane having a molecular weight of 800–50,000;
(b) heating the spun fiber in an oxidizing atmosphere at 50°–400° C. or irradiating the spun fiber in an oxidizing atmosphere with 10$^6$–10$^{10}$ R of the γ-ray radiation or $10^7$–$10^{10}$ Rad electron beam radiation to form an infusible fiber; and (c) heating the infusible fiber at a temperature of 800°–1,650° C. in a stream of ammonia gas.

2. A method according to claim 1, wherein the fiber is spun from molten polycarbosilane.

3. A method according to claim 1, wherein the fiber is spun from a solution containing the polycarbosilane.

4. A method according to claim 1, wherein the stream of ammonia gas is a flow rate of at least 50 cc/min.

5. A method according to claim 1 wherein the spun fiber is heated in an oxidizing atmosphere under a tension of 1–500 g/mm$^2$ or irradiated under a tension of 1–500 g/mm$^2$.

6. A method according to claim 1, wherein the infusible fiber is heated in a stream of ammonia gas under a tension of 1–5000 g/mm$^2$.

7. A method according to claim 1, comprising the further step of heating the fiber at a temperature of 800°–1,650° C. in an inert atmosphere.

8. A method for producing a continuous inorganic fiber consisting essentially of Si, N and O in a composition ratio wherein the atomic ratio of N/Si is 1.3/0.5 and that of O/Si is 1.0/0.05, which comprises:

(a) spinning a fiber from polycarbosilane having a molecular weight of 800–50,000;

(b) heating the spun fiber in an oxidizing atmosphere at 50°–400° C. or irradiating the spun fiber in an oxidizing atmosphere with $10^6$–$10^{10}$ R of γ-ray radiation or $10^7$–$10^{10}$ Rad electron beam radiation under a tension of 1–500 g/mm$^2$ to form an infusible fiber; and (c) heating the infusible fiber under a tension of 1–5000 g/mm$^2$ at a temperature of 800°–1,650° C. in a stream of ammonia gas at a flow rate of at least 50 cc/min.

* * * * *